(12) United States Patent
Yamaguchi

(10) Patent No.: US 6,246,495 B1
(45) Date of Patent: *Jun. 12, 2001

(54) PHASE-SHIFT DIGITAL HOLOGRAPHIC APPARATUS

(75) Inventor: Ichirou Yamaguchi, Wako (JP)

(73) Assignee: The Institute of Physical and Chemical Research, Wako (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,136

(22) Filed: Mar. 27, 1998

(30) Foreign Application Priority Data

Mar. 27, 1997 (JP) .................................................... 9-075807

(51) Int. Cl.[7] ...................................................... G03H 1/12
(52) U.S. Cl. ................................. 359/11; 359/1; 359/9; 356/345; 356/347; 356/359; 365/125
(58) Field of Search ..................... 359/1, 9, 11; 365/125; 356/359, 345, 347

(56) References Cited

U.S. PATENT DOCUMENTS 5,656,932 * 8/1997 Kitayoshi .............................. 324/615
5,777,742 * 7/1998 Marron ................................. 356/359

* cited by examiner

Primary Examiner—Cassandra Spyrou
Assistant Examiner—Craig Curtis
(74) Attorney, Agent, or Firm—Jacobson, Price, Holman & Stern, PLLC

(57) ABSTRACT

A phase-shift digital holographic apparatus shifts the phase of a reference wave by a phase shifting means, produces holographic image data by a holographic image pickup means having an image forming surface on which an object wave and the reference wave fall simultaneously, processes a plurality of holographic image data produced by the object wave and a plurality of reference waves of different phases determined by shifting the phase of the reference wave by the phase shifting means by an object wave calculating means to calculate phase data on the phase of the object wave and amplitude data on the amplitude of the object wave, and constitutes object wave data of the phase data on the phase of the object wave and the amplitude data on the amplitude of the object wave calculated by the object wave calculating means by a reproduced image calculating means and subjects the object wave data to a predetermined transformation process to calculate a reproduced image.

10 Claims, 2 Drawing Sheets

PHASE-SHIFT DIGITAL HOLOGRAPHIC APPARATUS

BACKGROUND OF THE INVENTION

1. Field of the Invention

The present invention relates to a phase-shift digital holographic apparatus and a phase-shift digital hologram producing method. More particularly, the present invention relates to a phase-shift digital holographic apparatus in which an object wave and a reference wave fall simultaneously on an image forming surface of a photoelectric imaging device, such as a CCD image sensor, to produce holographic image data, and a phase-shift digital hologram producing method.

2. Description of the Related Art

Digital holography, in contrast to compute holography, records an interference pattern produced by interference between an object wave and a reference wave by a photoelectric imaging device, and the interference pattern is processed by a computer to reproduce an image. A known digital holographic apparatus projects an object beam and a reference beam on an image forming surface so that a very large angle α is formed between the object beam and the reference beam as shown in FIG. 2 to produce a hologram by the so-called off-axis system. A reproduced image includes a zero-order and ± first-order images in a lateral arrangement. Therefore, ghost images appear near the reproduced image and only a true reproduced image cannot be obtained. The object beam and the reference beam must be projected on the image forming surface so that a sufficiently large angle is formed between the object beam and the reference beam, and the degree of off-axis is large. An object which produces the object beam must be a small one and hence the conventional digital holographic apparatus is capable of forming holograms of only objects of limited sizes. Furthermore, the number of effective image pickup elements available for producing a hologram among those arranged in the image forming surface is reduced, and all the image pickup elements in the image forming surface cannot be effectively use for producing a hologram.

The conventional off-axis system projects the object beam and the reference beam on the image forming surface so that a large angle α is formed between the object beam and the reference beam. Therefore, intervals between fringes forming a hologram is small, and the resolution of the image forming surface must be smaller than the intervals between the fringes forming the hologram. Consequently, it has been difficult to reproduce an image satisfactorily by the image pickup device having a resolution lower than that of photographic films.

SUMMARY OF THE INVENTION

Accordingly, it is an object of the present invention to solve the foregoing problems in the prior art and to provide a phase-shift digital holographic apparatus and a phase-shift digital hologram producing method capable of forming a reproduced image without forming any ghost image near the reproduced image and without requiring off-axis adjustment.

According to a first aspect of the present invention, a phase-shift digital holographic apparatus comprises, a phase shifting means for shifting the phase of a reference wave, a holographic image pickup means for producing holographic image data, having an image forming surface on which an object wave and the reference wave fall simultaneously, an object wave calculating means for processing a plurality of holographic image data produced by the object wave and a plurality of reference waves of different phases determined by shifting the phase of the reference wave by the phase shifting means to calculate phase data on the phase of the object wave and amplitude data on the amplitude of the object wave, and a reproduced image calculating means for constituting object wave data of the phase data on the phase of the object wave and the amplitude data on the amplitude of the object wave calculated by the object wave calculating means, and subjecting the object wave data to a predetermined transformation process to calculate a reproduced image.

The object wave and the reference wave fall on the image forming surface at substantially the same incidence angle.

The object wave and the reference wave fall on the image forming surface so that a small angle, that may cause a ghost image to appear near the reproduced image if the reproduced image is formed by transforming the holographic image data without constituting the object wave data, is formed between the object wave and the reference wave.

The phase shifting means may be provided with a piezoelectric device.

The number of the plurality of phases may be three, and the number of the plurality of holographic image data may be three.

The phase shifting means may shift the reference wave so that steps of the phases of the reference waves having different phases are 90°.

The predetermined transformation process may be a Fresnel transformation process.

According to a second aspect of the present invention, a phase-shift digital hologram producing method comprises the steps of shifting the phase of a reference wave by a phase shifting means to provide a plurality of reference waves of different phases, producing a plurality of holographic image data by making the object wave and each of the plurality of reference waves fall simultaneously on an image forming surface of a holographic image pickup means, calculating phase data on the phase of the object wave and amplitude data on the amplitude of the object wave by using the plurality of holographic image data by an object wave calculating means, constituting object wave data of the phase data on the phase of the object wave and the amplitude data on the amplitude of the object wave calculated by the object wave calculating means, and subjecting the object wave data to a predetermined transformation process to calculate a reproduced image by a reproduced image calculating means.

The amplitude data on the amplitude of the object wave may be calculated on the basis of holographic image data obtained by blocking the reference wave and making only the object wave fall on the image forming surface of the holographic image pickup means.

The phase of the reference wave may be shifted in a step of, for example, π/2 to produce, for example, three reference waves of different phases, each of the reference waves of different phases and the object wave are made to fall on the image forming surface to produce, for example, three holographic image data. Each of the plurality of holographic image data includes a mixture of data on the object wave and data on the reference wave. Simultaneous equations are solved by using the plurality of holographic image data to calculate the phase data on the phase of the object wave and the amplitude data on the amplitude of the object wave. The object wave data containing all the information necessary for forming a reproduced image is produced from the phase data on the phase of the object wave and the amplitude data on the amplitude of the object wave. The object wave data thus produced is subjected to the predetermined transformation process, such as a Fresnel transformation process to calculate the reproduced image.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
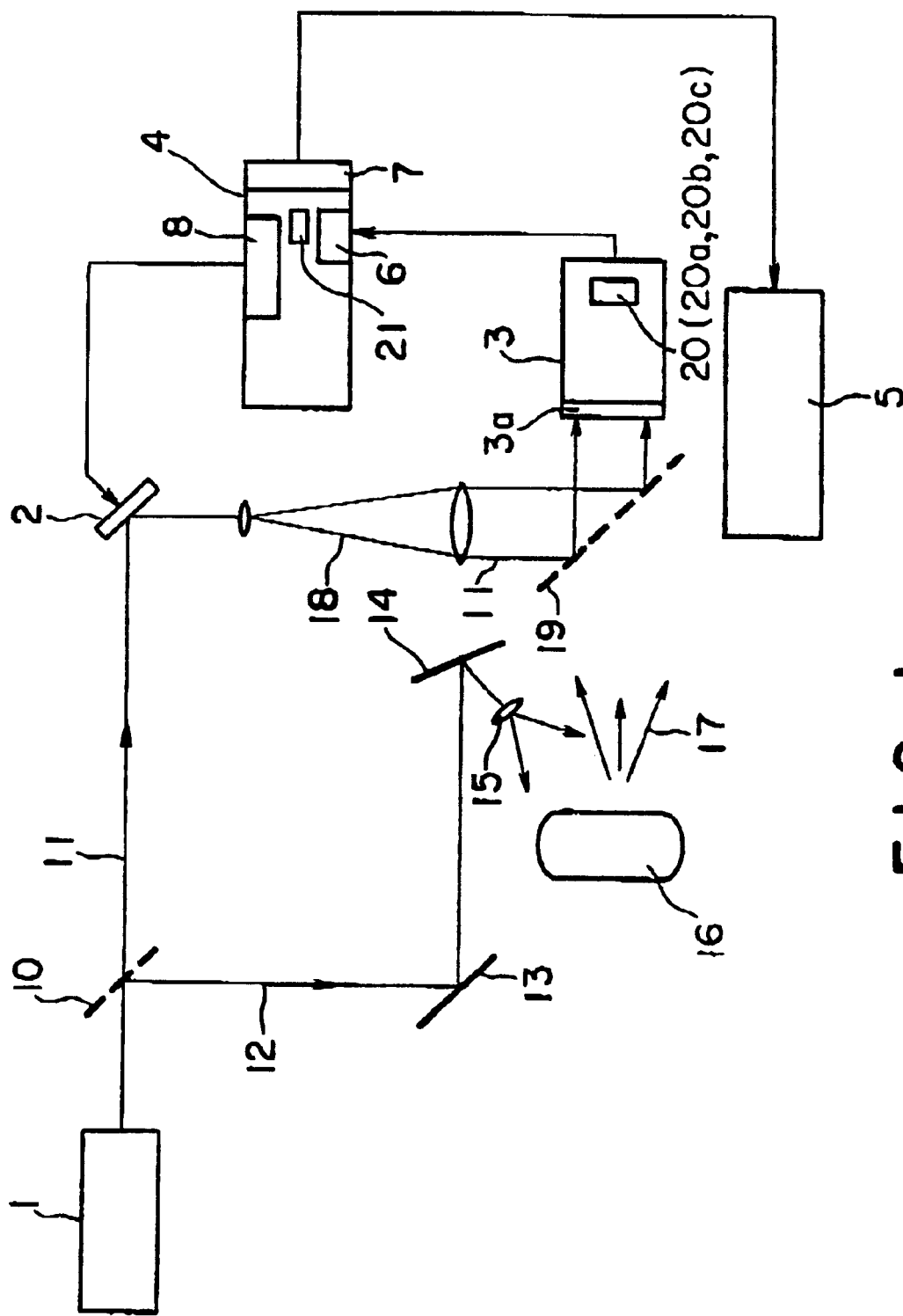
FIG. 1 is a block diagram of a phase-shift digital holographic apparatus in a preferred embodiment according to the present invention.

Referring to FIG. 1, a phase-shift digital holographic apparatus in a preferred embodiment according to the present invention comprises an Ar laser 1 of about 1 W in output power capable of emitting a laser beam of 514 nm in wavelength, a phase shifting device 2 having a piezoelectric element, a CCD image sensor 3, i.e., a holographic image pickup means, a computer 4 and a display 5 for displaying a reproduced image. The computer 4 includes an object wave calculating unit 6, a reproduced image calculating unit 7 and a phase shifting device control unit 8.

A coherent light beam emitted by the Ar laser 1 is split into a reference beam 11 and an object illuminating beam 12 by a semitransparent mirror 10. The object illuminating beam 12 travels through a reflecting mirrors 13 and 14 and a lens 15, and falls on an object 16 whose hologram is to be formed, and the object 16 radiates an object beam 17. The reference beam 11 is expanded by a beam expander 18, the waveform thereof is shaped as a plane wave, and is reflected by a semitransparent mirror 19. The reference beam 11 reflected by the semitransparent mirror 19 and the object beam 17 transmitted by the semitransparent mirror 19 are superposed on the image forming surface 3a of the CCD image sensor 3. The reference beam 11 and the object beam 17 fall simultaneously on the image forming surface 31 to make the CCD image sensor 3 produce holographic image data 20. The holographic image data 20 includes intensity data equal to the square of amplitude data on the amplitude of the object beam 17, intensity data equal to the square of amplitude data on the amplitude of the reference beam 11, and interference data. The interference data includes the amplitude data on the amplitude of the object beam 17, the amplitude data on the amplitude of the reference beam 11, and phase difference data representing the phase difference between the respective phases of the object beam 17 and the reference beam 11.

Figure 2:
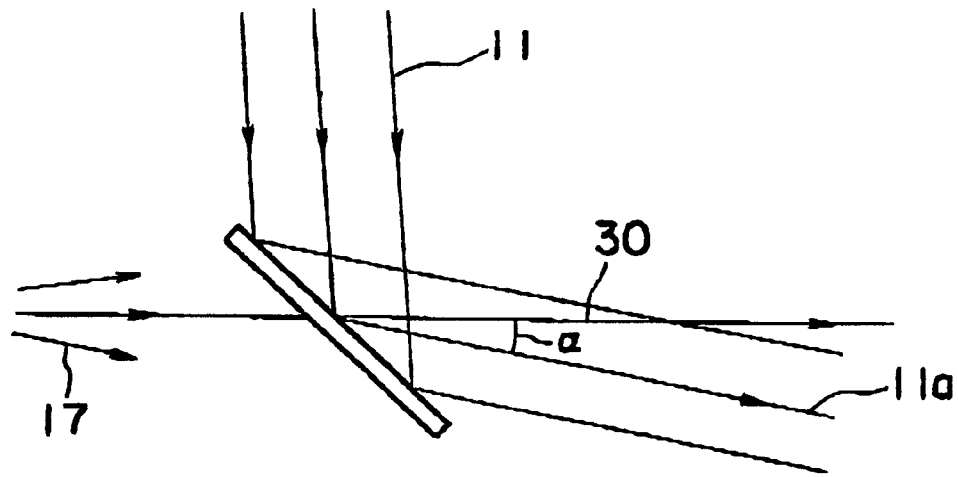
FIG. 2 is a diagrammatic view of assistance in explaining a crossing angle between a reference wave and an object wave.

Referring to FIG. 2, suppose that the optical axis 30 of the object beam 17 and the optical axis 11a of the reference beam 11 form a crossing angle α. In the present invention, it becomes possible to make the crossing angle αto be very small. The crossing angle α may be possible to be zero to make the object beam 17 and the reference beam 11 fall on the image forming surface 3a at the same incident angle. Even if the crossing angle α is such a small angle that will cause to make a ghost image appear near a reproduced image if the reproduced image is formed by the conventional hologram producing method, any ghost image will not appear in the present invention.

In the phase-shift digital holographic apparatus shown in FIG. 1, α=0, i.e., the optical axis 30 of the object beam 17 and the optical axis 11a of the reference beam are parallel. Any ghost image does not appear even if α=0 because the object beam data 21 is constituted of the phase data 17a and amplitude data 17b on the object beam 17 separately from the data on the reference beam 11, and the object beam data 21 separate from the data on the reference beam 11 is subjected to a predetermined transformation process (Fresnel transformation) to calculate a reproduced image, which is different from a reproduced image calculating method by which the conventional hologram producing method calculates a reproduced image.

The phase shifting device control unit 8 controls the phase shifting device 2 to produce three reference beams 11 of different phases by shifting the phase of the reference beam 11 in steps of π/2 to three different phases, such as 0 (initial phase), π/2 and π (or π/2, π and 3π/2). The three reference beams 11 and the object beam 17 are superposed on the image forming surface 3a of the CCD image sensor 3, and the CCD image sensor 3 produces three holographic image data 20a, 20b and 20c.

The object wave calculating unit 6 calculates the phase data 17a on the phase of the object beam 17 and the amplitude data 17b on the amplitude of the object beam 17 on the basis of the three holographic image data 20a, 20b and 20c. The reproduced image calculating unit 7 produces object beam data 21 from the phase data 17a on the phase of the object beam 17 and the amplitude data 17b on the amplitude of the object beam 17 calculated by the object wave calculating unit 6. The object beam data 21 is subjected to a Fresnel transformation to calculate a reproduced image. The reproduced image calculated by the reproduced image calculating unit 7 is displayed on the display 5.

Figure 3:
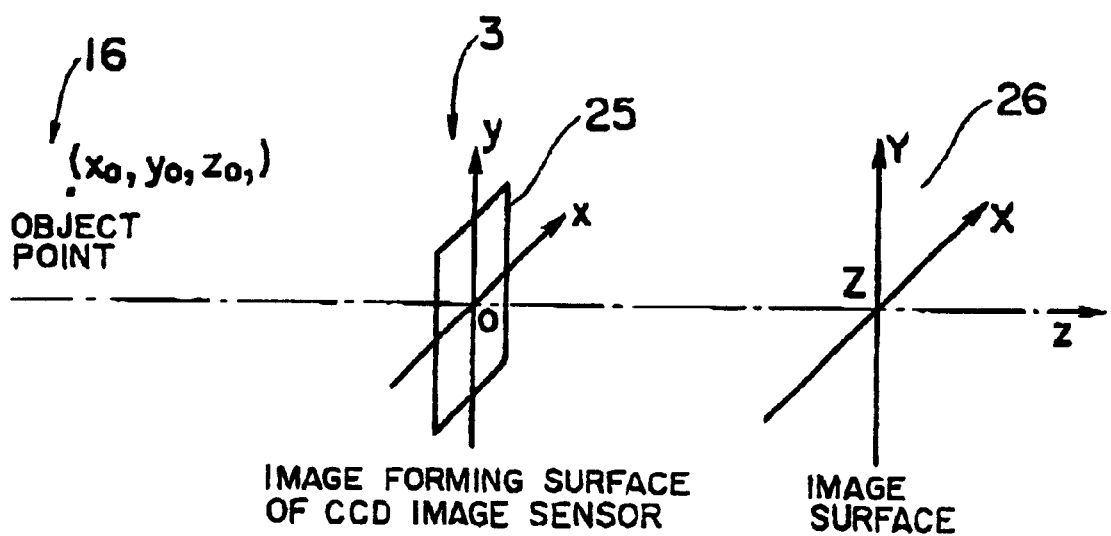
FIG. 3 is a diagrammatic view showing the relation between an object point, a coordinate system defining an image forming surface, and a coordinate system defining an image surface.

A procedure for producing the reproduced image will be described hereinafter with reference to FIG. 3. Referring to FIG. 3, a coordinate system (x, y, z) 25 defines a hologram plane (x, y, 0) on which a holographic data 20 representing a hologram formed on the image forming surface 3a of the CCD image sensor 3 is displayed. A reproduced image is displayed in a space defined by an image surface coordinate system (X, Y, Z). The object 16 is an object point indicated by coordinates $(x_0, y_0, z_0)$ on the hologram surface coordinate system (x, y, z). The object point indicated by the coordinates $(x_0, y_0, z_0)$ is illuminated with the object illuminating beam 12. The object beam 17 produced by the illuminated object point 16 is expressed by parabolic approximation on the hologram coordinate system (x, y, z) by Expression (1).

$$U(x, y) = A\exp(i\phi)\frac{A_0}{z_0}\exp\left[i\phi_0 + ikz_0 + ik(x - x_0)^2 + \frac{(y - y_0)^2}{2z_0}\right] \quad (1)$$

where φ corresponds to the phase data 17a on the phase of the object beam 17, A corresponds to the amplitude data 17b on the amplitude of the object beam 17, $A_0\exp(i\phi_0)$ is the complex amplitude of the object beam at the object point, and k is wave number.

The reference beam 11 has a complex amplitude expressed by: $U_R(\phi_R) = A_R\exp(i\phi_R)$.

First $\phi$ corresponding to the phase data 17a, and A corresponding to the amplitude data 17b are determined, and then a reproduced image is determined by the following procedure. The left-hand member of Expression (2) expresses the holographic image data 20 formed on the image forming surface 3a of the CCD image sensor 3.

$$I(x, y, \phi_R) = |U_R(\phi_R) + U(x, y)|^2 = A_R^2 + A^2 + 2A_R A \cos(\phi_R - \phi) \quad (2)$$

The phase $\phi_R$ of the reference beam 11 is shifted in steps of $\pi/2$ by the phase shifting unit 2 to produce three reference beams 11 respectively having phases 0, $\pi/2$ and $\pi$. The three reference beams 11 having those phases and the object beam 17 is superposed on the image forming surface 3a of the CCD image sensor 3 to produce three holographic image data 20a, 20b and 20c. Simultaneous equations expressing the three holographic image data 20a, 20b and 20c are solved by the object wave calculating unit 6 to determine the phase $\phi$ of the object wave 17 expressed by Expression (3).

$$I(x, y) = \tan^{-1} I(x, y; \pi/2) - I(x, y; 0) - \frac{I(x, y; \pi)}{I(x, y; 0) - I(x, y; \pi)} \quad (3)$$

where the initial phase of the reference beam 11 is 0. An actual amplitude $A(x, y)$ corresponding to the amplitude data 17b of the object wave 17 is determined from the result of calculation using Expression (3) and the three holographic image data 20a, 20b and 20c. The actual amplitude $A(x, y)$ can be determined also by blocking the reference beams 11 and allowing only the object beam 17 fall on the image forming surface 3a.

Then, $A\exp(i\phi)$ of Expression (1) corresponding to the object beam data 21 representing the object wave 17 from $\phi$ corresponding to the phase data 17a, and $A(x, y)$ corresponding to the amplitude data 17b. $U_1(X, Y, Z)$ representing a reproduced image on the image surface coordinate system $(X, Y, Z)$ is determined by subjecting $A\exp(i\phi)$ corresponding to the object beam data 21 to Fresnel transformation.

$$U_1(X, Y, Z) = \int\int U(x, y) \exp\left[ik\frac{(X-x)^2 + (Y-y)^2}{2Z}\right] dxdy \quad (4)$$

Integration using Expression (4) is carried out by the reproduced image calculating unit 7 to determine $U_1(X, Y, Z)$ representing a reproduced image is calculated to obtain a reproduced image of the object point $(x_0, y_0, z_0)$.

It is known from the following fact that the result of calculation using Expression (4) provides the reproduced image of the object point $(x_0, y_0, z_0)$. Expression (1) expressing the object beam 17 by parabolic approximation is substituted into Expression (4) to express $U_1(X, Y, Z)$ representing the reproduced image by Expression (5).

$$U_1(X, Y, Z) = \frac{A_0}{z_0}\exp\left[i\phi_0 + \frac{ik}{2}\left(\frac{X^2+Y^2}{Z} + \frac{x_0^2+y_0^2}{z_0}\right)\right] \times \int\int \exp \quad (5)$$

$$\left\{-ik\left[x\left(\frac{x_0}{z_0}+\frac{X}{Z}\right) + y\left(\frac{y_0}{z_0}+\frac{Y}{Z}\right) - \frac{x^2+y^2}{2}\left(\frac{1}{z_0}+\frac{1}{Z}\right)\right]\right\} dxdy$$

It is known from Expression (5) that $U_1(X, Y, Z)$ assumes a maximum intensity at $X=x_0$, $Y=y_0$ and $Z=-z_0$, which indicates that the result of calculation using Expression (4) corresponds to the reproduced image of the object point $(x_0, y_0, z_0)$.

In the foregoing description, the object 16 is represented by the object point $(x_0, y_0, z_0)$. A general three-dimensional object can be regarded as a set of object points. Therefore, Expression (5) shows that a reproduced image of a general three-dimensional object can be obtained by the phase-shift digital hologram producing method of the present invention.

The fact that $U_1(X, Y, Z)$ assumes a maximum intensity at $X=x_0$, $Y=y_0$ and $Z=-z_0$ can be empirically verified by the following experiment. A spot was used as an object point $(x_0, y_0, z_0)$, and a reproduced image was produced by using Expression (4). A sharp reproduced image could be produced when $X=x_0$, $Y=y_0$ and $Z=-z_0$), but a sharp reproduced image could not be produced when $(X, Y, Z)$ was dislocated from $(x_0, y_0, -z_0)$.

As mentioned above, according to the present invention, the phase of the reference beam 11 is shifted to produce the three reference beams 11 of different phases, the phase data 17a on the phase of the object beam 17 and the amplitude data 17b on the amplitude of the object beam 17 are calculated by using the three holographic image data 20a, 20b and 20c produced by the combinations of each of the three reference beams 11 and the object beam 17, and the object beam data 21 is constituted of the phase data 17a and amplitude data 17b on the object beam 17 separately from the data on the reference beam 11 to calculate a reproduced image. Therefore, the crossing angle $\alpha$ between the optical axis 30 of the object beam 17 and the optical axis 11a of the reference beam 11 may be equal to zero or a very small angle. Accordingly, off-axis adjustment to separate and eliminate ghost images is not necessary, and the object 16 needs not be limited to a small one. The limited number of image pickup elements in the image forming surface 3a can be effectively used. The reduction of the intervals between the fringes forming the hologram can be avoided, and hence the resolution of the image pickup device, which is lower than that of general photographic films, need not be very high.

Since the phase-shift digital holographic apparatus of the present invention produces the reproduced image by digital holography, the reproduced image can be displayed on the screen of a television set. Since the phase-shift digital holographic apparatus of the present invention produces the reproduced image by digital holography, focusing in producing the reproduced image can be achieved by a focusing method using focusing software to be carried out by the computer 4 instead of a mechanical focusing method. Therefore, the three-dimensional structure of an object changing at a too high changing rate to complete the focusing of the lens in time can be closely observed if the object is recorded by the recording method using the phase-shift digital holographic apparatus of the present invention. Furthermore, since the phase-shift digital holographic apparatus of the present invention produces the reproduced image by digital holography, the phase-shift digital holographic apparatus of the present invention is applicable to fields in which the use of lenses is difficult, such as those using sound waves, x-rays, infrared rays and the like.

Although the reference beam 11 and the object illuminating beam 12 in the foregoing description are visible light beams, the present invention is applicable also to fields using electromagnetic radiations other than visible radiations, such as x-rays, infrared-rays and the like, and those using waves other than electromagnetic waves, such as sound waves.

The following are examples of possible application of the present invention.

1. A three-dimensional image is reproduced by transferring measured amplitude and phase data to a spatial light modulator and illuminating an object by a laser beam.

2. A section of a reproduced image is displayed to determine the shape of the surface.

3. Images of a rough surface before and after deformation are reproduced, interference fringes representing deformation are displayed or the quantity of deformation is calculated automatically.

As is apparent from the foregoing description, according to the present invention, the phase of a reference wave is shifted by the phase shifting means to provide a plurality of reference waves of different phases, a plurality of holographic image data are produced by making the object wave and each of the plurality of reference waves fall simultaneously on an image forming surface of the holographic image pickup means, the phase data on the phase of the object wave and the amplitude data on the amplitude of the object wave are calculated from the plurality of holographic image data, the object wave data is constituted of the calculated phase data on the phase of the object wave and the calculated amplitude data on the amplitude of the object wave, and the object wave data is subjected to the predetermined transformation process to calculate the reproduced image. Therefore, a reproduced image not accompanied by ghost images can be produced without requiring off-axis adjustment, and the phase-shift digital holographic apparatus and the phase-shift digital hologram producing method are capable of easily producing the reproduced image with high accuracy.

Although the invention has been described in its preferred embodiment with a certain degree of particularity, obviously many changes and variations are possible therein. It is therefore to be understood that the present invention may be practiced otherwise than as specifically described herein without departing the scope and spirit thereof.

What is claimed is:

1. A phase-shift digital holographic apparatus comprising:
   a single wavelength light source for using as a reference wave and for generating an object wave emitting from an object;
   a phase shifting means for shifting a phase of the reference wave;
   a holographic image pickup means for producing holographic image data, having an image forming surface on which an object wave and the reference wave fall simultaneously, said object wave emitted from the object falling directly on the image forming surface without passing through a lens;
   an object wave calculating means for processing a plurality of holographic image data produced by the object wave and a plurality of reference waves of different phases determined by shifting the phase of the reference wave by the phase shifting means to calculate phase data on the phase of the object wave and amplitude data on the amplitude of the object wave; and
   a reproduced image calculating means for constituting object wave data of the phase data on the phase of the object wave and the amplitude data on the amplitude of the object wave calculated by the object wave calculating means, and subjecting the constituted object wave data to a two dimensional Fresnel transformation process to calculate a reproduced image, wherein the two dimensional Fresnel transformation process is done so that the reproduced image is represented by a two dimensional coordinate plane and a Z-coordinate value, wherein the two dimensional coordinate plane is set parallel to the image forming surface and the Z-coordinate value can be set so as to be related to a distance from the image forming surface to a position on the object in a direction perpendicular to the two dimensional coordinate plane, and wherein when the Z-coordinate value is set to said distance, the reproduced image represents a two dimensional image of the object at said position on the object.

2. The phase-shift digital holographic apparatus according to claim 1, wherein the object wave and the reference wave fall on the image forming surface at substantially the same incidence angle.

3. The phase-shift digital holographic apparatus according to claim 1, wherein the object wave and the reference wave fall on the image forming surface so that a small angle, that may cause a ghost image to appear near the reproduced image if the reproduced image is formed by transforming the holographic image data without constituting the object wave data, is formed between the object wave and the reference wave.

4. The phase-shift digital holographic apparatus according to claim 1, wherein the phase shifting means is provided with a piezoelectric device.

5. The phase-shift digital holographic apparatus according to claim 1, wherein the number of the plurality of phases is three, and the number of the plurality of holographic image data is three.

6. The phase-shift digital holographic apparatus according to claim 1, wherein the phase shifting means shifts the phase of the reference wave so that steps of the phases of the reference waves having different phases are 90°.

7. The phase-shift digital holographic apparatus according to claim 1, wherein the Z-coordinate value is set mathematically.

8. A phase-shift digital hologram producing method comprising the steps of:
   shifting the phase of a reference wave of a single wavelength generated by a single wavelength light source by a phase shifting means to provide a plurality of reference waves of different phases;
   producing a plurality of holographic image data by making the object wave and each of the plurality of reference waves fall simultaneously on an image forming surface of a holographic image pickup means, said object wave emitted from the object falling directly on the image forming surface without passing through a lens;
   calculating phase data on the phase of the object wave and amplitude data on the amplitude of the object wave by using the plurality of holographic image data by an object wave calculating means;
   constituting object wave data of the phase data on the phase of the object wave and the amplitude data on the amplitude of the object wave calculated by the object wave calculating means; and subjecting the constituted object wave data to a two dimensional Fresnel transformation process to calculate a reproduced image, wherein the two dimensional Fresnel transformation process is done so that the reproduced image is represented by a two dimensional coordinate plane and a Z-coordinate value, wherein the two dimensional coordinate plane is set parallel to the image forming surface and the Z-coordinate value can be set so as to be related to a distance from the image forming surface to a position on the object in a direction perpendicular to the two dimensional coordinate plane, and wherein when said Z-coordinate value is set to said distance, the reproduced image represents a two dimensional image of the object at said position on the object.

9. The phase-shift digital hologram producing method according to claim 8, wherein the amplitude data on the amplitude of the object wave is calculated on the basis of holographic image data obtained by blocking the reference wave and making only the object wave fall on the image forming surface of the holographic image pickup means.

10. The phase-shift digital hologram producing method according to claim 8, wherein the Z-coordinate value is set mathematically.

* * * * *